UNITED STATES PATENT OFFICE.

MARCELLUS S. WHITESIDE, OF MEXICO, MISSOURI.

REMEDY FOR HOG-CHOLERA.

SPECIFICATION forming part of Letters Patent No. 340,648, dated April 27, 1886.

Application filed January 18, 1886. Serial No. 188,974. (No specimens.)

*To all whom it may concern:*

Be it known that I, MARCELLUS S. WHITESIDE, a citizen of the United States, residing at Mexico, in the county of Audrain and State of Missouri, have invented a new and useful Remedial Agent for Hog-Cholera, of which the following is a specification.

This invention relates to the processes of utilizing waste meats, and has for its object to provide means whereby waste meats, bones, fat, &c., may be advantageously utilized, and whereby a final product is obtained that, when compounded with certain chemicals, has proven an effective remedial agent in that disease which affects swine, and which is known as "hog-cholera."

The invention consists in a novel mode of compounding the remedial agent, and in a novel compound for use as a remedial agent for hog-cholera.

In carrying out my invention I place the scraps or refuse of meat, bones, and fat into any suitable vessel and cover the same with an aqueous solution of an alkali—such as potash of a strength of about 10° Baumé—and to each gallon of this solution I add one pound of common salt. In this solution the scraps or refuse meat, &c., may be kept until a sufficient quantity of material has accumulated. When a sufficient quantity of such material has accumulated, it is boiled, and, if raw material is used, the same is boiled until thoroughly done, allowed to settle and cool, and the fat skimmed off. This fat may be used for making soap or axle-grease, in which case a little resin or pine-tar may be added, which will materially improve it. The boiled material deprived of its fatty constituents is then saponified by boiling with an alkali, as usual, and the saponified supernatant material removed from the gelatinous lye or residue, which forms the fluid basis for the remedial agent referred to.

The saponified material may be used for any purpose for which soap is usually employed, though an improved soap may be obtained by reboiling and adding to each ten gallons one pound of resin and one-quarter pound of sal-soda. The remaining gelatinous residuum referred to is then poured in a suitable vessel, and to every gallon is added one-quarter pound of copperas, one-half pound of cooking salt, one-tenth pound of sulphur, one-tenth pound of sal-soda, one-half gill of turpentine, and one-quarter gill of coal oil, and the whole intimately mixed.

This mixture has been found to possess superior medicinal properties in the treatment of hog-cholera, and is, after the intimate admixture of the ingredients, stored in suitable vessels and is ready for use.

If the compound is to be used as a preventative of the disease, I place a quantity of it in a place where the swine will have ready access to and can partake of the same; or I may feed them with the agent—say, once a week—allowing them to partake of as much as they will.

In administering the compound as a remedy to swine afflicted with the disease, I administer the compound in doses of from one-half to three-fourths of a pound once a day. If the animals are too ill to eat, I deprive them of water for about twenty-four hours, and then give them water to which has been added the remedial agent.

I do not desire to claim herein the composition of matter described and claimed in Letters Patent of the United States No. 54,944, of 1868; nor do I desire to claim herein the process of saponification described in Letters Patent of the United States No. 99,978, of 1870.

What I claim is—

The herein-described remedial agent, consisting of the described gelatinous residuum resulting from boiling together refuse meat and solution of potash, combined with copperas, salt, sulphur, sal-soda, turpentine, and coal-oil, in or about in the proportions specified.

In testimony whereof I affix my signature in presence of two witnesses.

MARCELLUS S. WHITESIDE.

Witnesses:
W. H. KENNON,
J. K. FRITTS.